United States Patent [19]
Hambitzer et al.

[11] Patent Number: 5,587,064
[45] Date of Patent: Dec. 24, 1996

[54] WASTE WATER PURIFICATION PROCESS AND APPARATUS

[75] Inventors: Günther Hambitzer, Pfinztal; Winfried Böke, Karlsruhe; Armin Oertel, Pfinztal, all of Germany

[73] Assignee: Fraunhofer-Gesellschaft zur Forderung der angewandten Forschung e.V., Munich, Germany

[21] Appl. No.: 513,235

[22] Filed: Aug. 10, 1995

[30]     Foreign Application Priority Data

Aug. 13, 1994 [DE] Germany ............... 44 28 787.9

[51] Int. Cl.⁶ ............................................. C02F 1/461
[52] U.S. Cl. .................... 205/742; 205/759; 205/771; 204/217; 204/226; 204/227; 204/275
[58] Field of Search ............................ 204/149, 115, 204/129, 217, 226, 227, 275; 205/742, 759, 771

[56]                References Cited

U.S. PATENT DOCUMENTS

| 1,959,376 | 5/1934 | Lucas | 204/105 |
|---|---|---|---|
| 3,616,277 | 10/1971 | Adamson et al. | 204/115 |
| 3,772,003 | 11/1973 | Gordy | 204/111 |
| 4,028,199 | 6/1977 | Holland | 204/114 |

FOREIGN PATENT DOCUMENTS

| 0452597 | 4/1990 | European Pat. Off. . |
|---|---|---|
| 0522232 | 2/1992 | European Pat. Off. . |
| 36610 | 12/1984 | Germany . |
| 36945 | 2/1986 | Germany . |
| 3705956 | 2/1987 | Germany . |
| 4033016 | 10/1990 | Germany . |
| 56-123388 | 9/1981 | Japan . |
| 60-005892 | 1/1985 | Japan . |
| 5115875 | 5/1993 | Japan . |
| 8700210 | 1/1987 | WIPO . |

OTHER PUBLICATIONS

R. Ott, "Ätzverfahren mit electrochemischer Regenerierung und Kupferrückgewinnung, für die Leiterplattenfertigung", appearing in Chem.-Ing.-Tech. 63 (1991) N. 9, pp. 946–947 (no month).

B. M. Kim et al, "Electrloytic Removal of Heavy Metals from Wastewaters", appearing in *Environmental Progress*, (vol. 1, No. 2), May 1982, pp. 121–125.

L. Hartinger, "Handbuch der Abwasser–und Recyclingtechnik", Carl Hanser Verlag München, 2 Aufl., 1991, Kap. 7.6.2.1 (no month).

*Primary Examiner*—Arun S. Phasge
*Attorney, Agent, or Firm*—Antonelli, Terry, Stout & Kraus

[57]                     ABSTRACT

For the purification of heavy metal-containing wastewater, a process according to the invention deposits heavy metal deposits on a cathode or cathodes which are mechanically removed. For this purpose the invention provides an apparatus having a device for the mechanical removal of the heavy metal deposits on the cathode or cathodes.

14 Claims, 1 Drawing Sheet

WASTE WATER PURIFICATION PROCESS AND APPARATUS

BACKGROUND OF THE INVENTION

1. Field of the Invention

The invention relates to a process and to an apparatus for purifying waste water, which contains heavy metals, which are cathodically deposited and having at least one cathode and one anode.

The invention relates to the purification of solids-containing waste waters, such as sludges, watercourse sediments or dredger sludge.

2. Description of the Prior Art

Hitherto use has been made of physicochemical processes, such as precipitation, filtration, extraction and oxidation. The known processes are only partly able to satisfy and at a high cost the ever stricter requirements regarding the purification of such waste waters, particularly due to the lower legal limits for pollutants in waste waters and deposited precipitation products. The precipitates and/or filtrate must be dumped as special refuse. No further processing or reuse is possible. Another disadvantage of the known waste water purification processes is the generally necessary addition of chemicals for precipitating the heavy metal impurities, so that the waste volume and salt freight are increased.

It is known to use electrochemical processes for the recovery of precious metals and e.g. copper in production processes, in which corresponding solutions occur. However, the known processes are unsuitable for the purification of waste waters, which in general contain several heavy metals and have a complex composition, particularly solids-containing waste waters and on a major industrial scale, because they are generally only designed for smaller quantities and it is only possible to operate in a discontinuous therewith.

SUMMARY OF THE INVENTION

The problem of the invention is to provide a process and an apparatus which, avoiding the aforementioned disadvantages, are suitable for the industrial scale purification of heavy metal-containing waste waters.

In the case of a process of the aforementioned type, this problem is solved by the invention in that heavy metal deposits on the cathode are mechanically removed. An apparatus for solving the set problem is characterized by a device for mechanically removing heavy metal deposits from the cathode. Thus, according to the invention the active surface of the cathode is worked in such a way as to renew the same, preferably by machining, including scraping and grinding. Such permanently active cathode surfaces are specifically suitable for undefined and constantly varying waste water compositions.

The process and apparatus make it possible to vary and/or implement almost all parameters influencing the space-time yield, such as the electrode surface and spacing, electrolyte volume and flow rate, current coverage and use of different electrode materials with in each case having different electrochemical characteristics in a reactor. Thus, all process and apparatus features can be optimized with a view to a maximum space-time yield.

According to the invention heavy metals are deposited continuously on the electrodes from continuously flowing waste water and are also continuously mechanically removed from the electrodes, so that the heavy metals are obtained in pure, reusable form.

According to preferred embodiments of the process according to the invention the cathode and a tool for removing the deposits are moved continuously relative to one another and in particular disk-shaped cathodes and the tool for removing the deposits are moved along one another. According to a further development of the process of the invention, the heavy metal deposits are scraped from the cathodes, although an abrading or machining of the deposits is also possible.

According to a preferred development of the process according to the invention, the anode is dynamically formed by lead dioxide deposits from the waste water on an anode base material and in particular if the lead content is inadequate lead is added to the waste water. The anode has a high oxygen overvoltage. Thus, organic substances, such as the aforementioned organic metal complexes, are oxidatively decomposed on the anode to environmentally acceptable products and the metals are optionally obtained in dissolved form. The metals are then cathodically deposited on the cathode in the aforementioned way. The gases occurring on the anode and cathode can be collected and burned, so that the heat generated can be used for reheating the waste water to be purified.

As has been stated, the anode is a dynamic or self-renewing lead dioxide anode and optionally the anode base material is titanium. In order to improve the dynamic lead dioxide formation on the anode or the initiation of the formation, the anode can be previously treated with platinum or palladium, i.e. precoated with said materials. It is also possible to use as anode materials Sn/Pb, graphite, carbon and composites, in which the electro-chemically active metals, alloys, metal oxides, etc. are incorporated into a plastic matrix. These anode materials are consequently accessible to a mechanical surface machining. In this way it can be ensured that the anode has a permanent electrochemically active surface. According to a preferred development the lead dioxide coating on the anode is mechanically kept to a predetermined thickness. This also preferably takes place in machining manner, more especially by scraping or grinding, so that in the case of lead dioxide the coating thickness can be limited to a maximum value. This is particularly advantageous in the case of waste waters with high lead contents.

Whereas fundamentally a direct current flows between the cathode and the anode, according to a preferred development a pulsed direct current flows between the cathodes and anodes or the current flow between the cathodes and anodes is briefly interrupted. This prevents polarization effects on the electrodes. In addition, there is a brief dropping below the deposition potential for lead dioxide, so that consequently the lead dioxide coating thickness on the anode can be regulated in such a way as to obviate any mechanical removal when the coating is too thick, although such a procedure can be adopted. This enables the influencing of the coating thickness of the lead dioxide coating growing on the anode, particularly so as to ensure an adequate spacing between the cathode and the anode.

According to another preferred development, the resulting gaseous reaction products are burned and the waste water preheated and in particular the waste water is preheated by the heat generated during the combustion of the gaseous reaction products.

BRIEF DESCRIPTION OF THE DRAWINGS

According to a further development of the apparatus according to the invention the cathodes are constructed as rotary disks, which are partly immersed in the waste water and are rotatable relative to the cutting device. More particularly when there are at least two cathodes one cathode and the cutting device are movable under elastic pressure against the other cathode. The rotary drive takes place by means of a motor. The cathodes are in particular those which have a high overvoltage against hydrogen. The cathode is generally made from iron. However, it can also be made from steel, preferably high-grade steel, or from suitable carbon materials such as graphite or glassy carbon. The materials are generally located on a suitable carrier or support layer.

For removing the metal deposits on the cathode there are cutting edges on the cutting device enabling the removal by grinding, scraping or cutting of the deposits as a function of the level of the pressure exerted. For discharging the metal deposits removed from the cathodes a channel or trough is provided by means of which the metal deposits can be led off, e.g. by periodic rinsing.

Alternatively to providing the apparatus according to the invention with disk-shaped, rotating cathodes, the cathode can be constructed as a belt guided by means of rolls and which is immersed in the waste water.

The apparatus according to the invention leads to a high, optimized space-time yield. This is an unavoidable prerequisite for the technical implementation of in particular a waste water treatment plant operated on an industrial scale.

In the case of the apparatus according to the invention, it is possible by the controllable pressure of the second, circular cathode plate on the grinding device and from the latter on the first cathode plate to work the surfaces of the cathodes in accordance with requirements, i.e. only scraping or machining, i.e. so as to remove the cathode base material surface. This property is particularly advantageous in the electrolytic treatment of undefined waste waters with in part high solids contents. It consequently permits the availability of a constant, electrochemically active cathode surface.

BRIEF DESCRIPTION OF THE DRAWINGS

Figure 1:
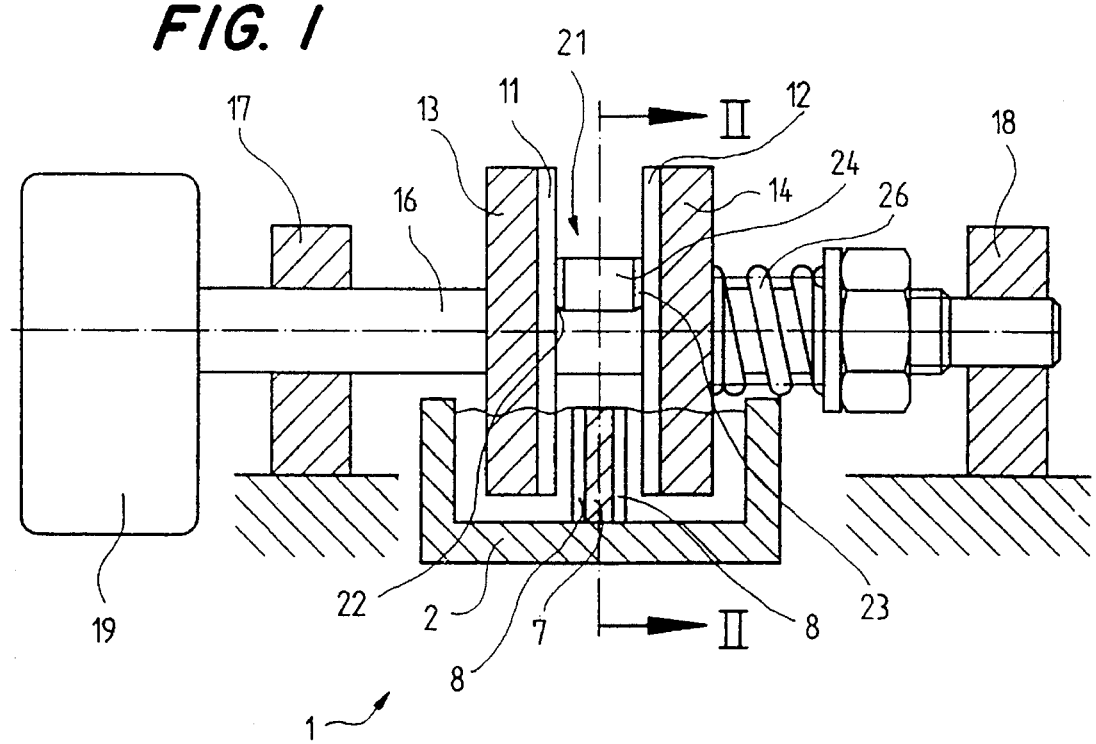

Further advantages and features of the invention can be gathered from the claims and the following description of an embodiment of the invention and with reference to the attached drawings which show:

FIG 1. Brief Description of is a vertical longitudinal section through the preferred embodiment of the apparatus according to the invention in accordance with I—I of FIG. 2.

Figure 2:
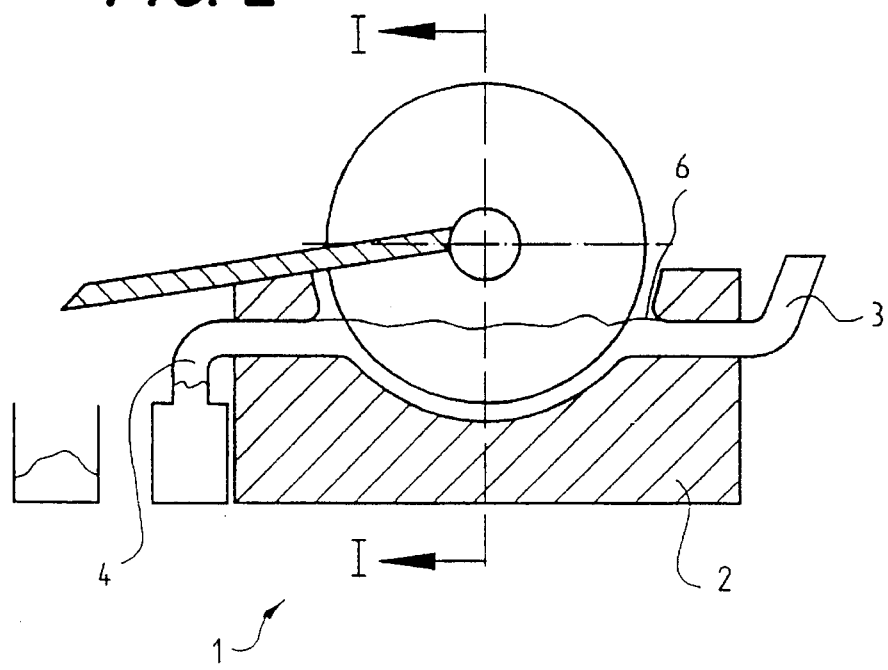

FIG. 2 is a vertical section corresponding to II—II of FIG. 1.

DESCRIPTION OF THE PREFERRED EMBODIMENT

The apparatus 1 according to the invention has a reaction vessel in the form of a tank 2. A waste water feed 3 leads to the tank 2 and also a drain 4 is provided, which is preferably constructed in such a way that there is always a constant liquid level 6 in the tank 2.

Centrally in the tank 2 is provided with a support 7, e.g. of PVC, which is provided with anodes 8 on either side. The anodes 8 are completely covered by the waste water to be treated. The anodes 8 have a basic titanium body. They can also be pretreated with platinum or palladium, i.e. a thin platinum or palladium coating can be applied thereto prior to use. During the cleaning of the waste waters the anodes 8 form dynamic, lead dioxide-coated titanium electrodes, in that during the cleaning of the heavy metal-containing waste waters a lead dioxide coating forms on the titanium base coating. If the waste waters do not have an adequate lead content, then lead can be added thereto. The addition of lead is associated with no additional waste water burden, because the added lead is eliminated again during the cleaning process.

On either side of the anodes 8, two cathodes 11, 12 project into the tank 2 and are constructed as disks rotatable relative to the tank 2 and are also placed on supports 13, 14. The cathodes 11, 12 are located in non-rotary manner on a shaft 16, which is mounted in bearings 17, 18 and driven by a motor 19. Between the cathodes 11, 12 is positioned a cutting device 21, which is displaceable in the direction of the axis of the shaft 16, but is non-rotary relative to the tank 2. The cutting device has cutting edges 22, 23, which engage on the cathodes 11, 12 and between which is formed a draining channel 24. The cathode 12 with its support 14 is admittedly non-rotary, but is axially displaceably located on the shaft 16. It is pressed elastically by a spring 26 against the cutting device and by means of the latter onto the cathode 11.

Thus, the cutting edges 22, 23 always engage under pressure on the end face of the cathodes 11, 12 facing the same, so that during the rotation of the cathodes 11, 12 the deposits formed thereon are removed. The deposits are carried away by means of the channel 24, e.g. in that the latter is continuously or periodically rinsed or a slider can be moved over the same. The cathodes 11, 12 and the anodes 8 are interconnected electrically by means of an optionally pulsed direct current source (not shown).

For operation the cathodes 11, 12 are rotated by the motor drive 19. The cathodes 11, 12 rotate at a low speed. Through the feed 3 waste water is supplied to the tank 2 and is removed via the drain 4. Between the anodes 8 and the cathodes 11, 12 is applied optionally pulsed direct current. As explained, a lead dioxide coating forms on the anodes 8. On the anodes 8 are oxidized organic compounds, particularly also organic metal compounds, so that in particular gaseous products can be formed, which are optionally collected and burned. The resulting heat can optionally be used for preheating the waste water supplied via the feed 3, which improves the efficiency of the purification process according to the invention.

Heavy metal is cathodically deposited on the cathodes 11, 12 and becomes attached thereto. As a result of the rotation of the cathodes 11, 12 the metal deposits are removed, e.g. by scraping or grinding by the cutting edges 22, 23 of the cutting device 21 and slide into the channel 24 from which they are removed in the described manner.

We claim:

1. A method for cleaning wastewater containing heavy metals, which are deposited cathodically, with at least one cathode and at least one anode, a cutting device for mechanically removing the heavy metal deposits on the cathode, the removed deposits being separated form the wastewater, with the at least one cathode and the cutting device being moved relative to one another, with a variable pressure force between the at least one cathode and the cutting device and with a lead dioxide layer on the at least one anode being formed in a self-renewing manner by deposition of lead dioxide from the wastewater on an anode base material, and with the lead dioxide layer on the at least one anode is maintained at a specified thickness.

2. A method according to claim 1 wherein:
the heavy metal deposits are scraped from the cathodes.

3. A method according to claim 1 wherein:

lead is added to the wastewater if the wastewater has an inadequate lead content.

4. A method according to claim 1 wherein:

any gaseous reaction products which are formed are burned.

5. A device for cleaning wastewater containing heavy metals which are deposited cathodically comprising:

at least one cathode and at least one anode, a cutting device for mechanically removing the heavy metal deposits on the at least one cathode, the at least one cathode and the cutting device for mechanically removing the heavy metal deposits being movable relative to one another, a device for separating the removed deposits from the wastewater, the at least one cathode and the cutting device for removing the heavy metal deposits being pressed elastically against one another, a lead dioxide layer on an anode base material formed in a self-renewing manner by deposits of lead dioxide from the wastewater and a device for maintaining the lead dioxide layer on the anode at a specified thickness.

6. A device according to claim 5 wherein:

the cathodes are constructed as rotary disks, are partly immersed in the wastewater and are rotatable relative to the cutting device.

7. A device according to claim 6 further comprising:

at least two cathodes, and wherein one cathode and the cutting device are movable under elastic pressure against another cathode.

8. A device according to claim 5 further comprising:

a motor rotary drive for rotating the cathodes.

9. A device according to claim 5 wherein:

the cathodes have a hydrogen overvoltage.

10. A device according to claim 5 wherein:

the anodes have an oxygen overvoltage.

11. A device according to claim 5 wherein:

the anodes have titanium as the anode base material.

12. A device according to claim 5 wherein:

the anodes are pretreated with one of platinum or palladium.

13. A device according to claim 5 wherein:

the cutting device has cutting edges engaging against the cathodes for the mechanical removal of the heavy metal deposits.

14. A device according to claim 5 wherein the device for separating comprises:

a channel for leading away the heavy metal deposits removed from the cathodes.

* * * * *